United States Patent [19]

Bell et al.

[11] Patent Number: 5,064,930

[45] Date of Patent: Nov. 12, 1991

[54] SOLID PHASE POLYARYLATE PROCESS

[75] Inventors: Bruce C. Bell; Winston J. Jackson, Jr., both of Kingsport, Tenn.

[73] Assignee: Eastman Kodak Company, Rochester, N.Y.

[21] Appl. No.: 588,777

[22] Filed: Sep. 27, 1990

[51] Int. Cl.[5] ........................ C08G 63/02; C08G 63/18
[52] U.S. Cl. ..................................... 528/182; 528/176; 528/179; 528/194
[58] Field of Search ................ 528/176, 179, 182, 194

[56] References Cited

U.S. PATENT DOCUMENTS

| | | | |
|---|---|---|---|
| 4,316,981 | 2/1982 | Brunelle | 528/199 |
| 4,386,186 | 5/1983 | Maresca et al. | 525/68 |
| 4,429,105 | 1/1984 | Charbonneau | 528/207 |

OTHER PUBLICATIONS

Macrobolecules 1989, 22, 1074–1077.
Angew, Chem. Ed. Engl. 17, 569–83, 1978.
1969 J. Opt. Soc. Am. 59, 986–90.

Primary Examiner—Harold D. Anderson
Assistant Examiner—T. Mosley
Attorney, Agent, or Firm—Charles R. Martin; William P. Heath, Jr.

[57] ABSTRACT

A process comprising
(A) preparing a solid polyarylate prepolymer having an inherent viscosity of at least about 0.1 by heating at a temperature in the range of 140° C. to 300° C. in the melt phase an acid anhydride derived from a carboxylic acid containing 2 to 6 carbon atoms, a dihydric phenol and an aromatic dicarboxylic acid in the presence of a hypernucleophilic base which comprises a heterocyclic aromatic compound containing nitrogen and having an aprotic electron releasing group directly bonded to a carbon atom in the aromatic compound, and
(B) increasing the molecular weight of the solid polyarylate prepolymer to an inherent viscosity of at least 0.4.

6 Claims, No Drawings

SOLID PHASE POLYARYLATE PROCESS

This invention relates to a solid phase process for preparation of a polyarylate.

Many processes have been reported in the literature for preparation of polyarylates. For example, it is well known that polyarylates can be prepared by preparing an admixture of an anhydride, a bisphenol and a dicarboxylic acid and then heating the admixture. Initially the anhydride reacts with the bisphenol to form the diester of the phenol and the diester subsequently polymerizes with the dicarboxylic acid in the melt to form a low molecular weight polymer. The low molecular polymer can then be solid phased to build up the molecular weight of the polymer to the desired level.

Preparation of a specific polyarylate using a preformed diester and dimethylaminopyridine is disclosed in *Macromolecules* 1989, 22, 1065–1074.

The acetylation of phenols with acetic anhydride using 4-dimethylaminopyridine is disclosed in *Angew. Chem. Ed. Engl.* 17, 569–83, 1978.

This invention is an improvement over the processes of the prior art. The improvement consists of two aspects. First, the process is a solid phase process wherein the diester and dicarboxylic acid polymerize into a low molecular weight polymer in the melt phase and subsequently the low molecular weight polymer is built up in molecular weight. Second, a hypernucleophilic base is used as a catalyst. The combination of these two aspects results in an unobvious combination of faster reaction time and better color.

By the term "better color" we mean that there is less discoloration of the polymer. The absence of color can be quantitatively expressed in terms of Color Difference wherein a lower value of Color Difference means that the polymer has less yellow discoloration.

Broadly, the process of this invention can be described as a process of preparing a polyarylate comprising (A) preparing a solid polyarylate prepolymer having an inherent viscosity of at least about 0.1 by heating at a temperature in the range of 140° C. to 300° C. in the melt phase an acid anhydride derived from a carboxylic acid containing 2 to 6 carbon atoms, a dihydric phenol and an aromatic dicarboxylic acid in the presence of a hypernucleophilic base which comprises a heterocyclic aromatic compound containing nitrogen and having an aprotic electron releasing group directly bonded to a carbon atom in the aromatic compound, and (B) increasing the molecular weight of the solid polyarylate prepolymer to an inherent viscosity of at least 0.4.

The hypernucleophilic base useful in the invention corresponds to a specific class of organic compounds. Broadly the hypernucleophilic base can be described as a heterocyclic aromatic compound containing nitrogen and having an aprotic electron-releasing group directly bonded to a carbon atom in the aromatic compound. These compounds are well known in the art and are disclosed in U.S. Pat. No. 4,316,981. In general, all pyridine base compounds that are substituted in the 4 position with an electron-donating group which is incapable of undergoing a side reaction with the other components, excluding acid/base interactions that do not interfere with the activity of the catalyst, are within the scope of this invention. Other heterocyclic aromatic nuclear structures containing nitrogen, besides pyridine, that are substituted with an electron-donating group conjugated to the ring nitrogen but not next (ortho) to it are also within the scope of the invention. Illustrative of such electron-donating groups are tertiary amines (—NR$_2$, —NRR″), alkoxys (—OR), thioethers (—SR) and phosphines (—PR$_2$, —PRR′). R and R″ may be connected together to give a cycloaliphatic group. Also R and R′ may similarly be connected. Protic "electron-donating groups" such as primary (—NH$_2$) or secondary amines (—NHR), hydroxys (—OH) or mercaptos (—SH) are not within the scope of the invention since they can react with the aromatic carboxylic acid functionality to form amides, esters and thioesters and terminate chain growth. Other electron-donating groups such as alkanoates (—OCOR) and thioalkanoate (—SCOR) can transesterify under these reaction conditions, also limiting polymer chain growth. Examples of particularly useful hypernucleophilic bases are 4-pyrrolidinopyridine and 4-piperidinopyridine. A particularly preferred class of hypernucleophilic bases are 4-dialkylaminopyridines. The alkyl group can be straight chain or branched and can contain from 1 to 7 carbon atoms, or the two alkyl groups can be connected together to give a cycloaliphatic group. Methyl and ethyl are preferred with methyl being most preferred.

The amount of hypernucleophilic base is not critical but can vary from 0.01 to 1.0 mol % with from 0.07 to 0.20 mol % being preferred.

The acid anhydride useful in this invention is derived from an aliphatic carboxylic acid which contains from 2 to 6 carbon atoms. Examples include acetic anhydride, propionic anhydride, butyric anhydride, pentanoic anhydride and the like. Acetic and propionic anhydrides are most preferred.

The amount of anhydride which may be used in the process of the invention may vary from a stoichiometric amount to 50% molar excess, but less than 20 and preferably less than 10% molar excess is preferred in order to obtain a polyarylate having the best color.

The aromatic dicarboxylic acids that may be used in this invention include terephthalic acid, isophthalic acid, any of the naphthalenedicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers and the like. Preferably the dicarboxylic acid is either isophthalic acid or a mixture of isophthalic acid and terephthalic acid. When a mixture of isophthalic acid and terephthalic acid is used the ratio of isophthalic acid to terephthalic acid is preferably in the range of 100:0 to 25:75.

The dihydric phenol useful in this invention can broadly be described as an aromatic compound having at least two hydroxy groups. Dihydric phenols suitable for use in this invention are disclosed in U.S. Pat. No. 4,386,186.

In a preferred embodiment the dihydric phenol corresponds to the formula

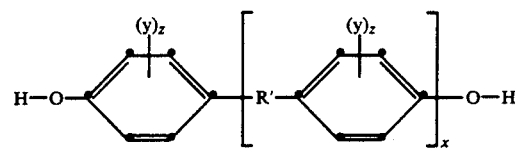

wherein y is selected from alkyl groups of 1 to 4 carbon atoms, chlorine, or bromine, z has a value of from 0 to 4, and R' is a chemical bond connecting the aromatic rings or is selected from a divalent aliphatic hydrocarbon radical having 1 to 8 carbon atoms, a cycloalkylene, or cycloalkylidene radical having up to 9 carbon atoms, O, S, SO, $SO_2$ or CO and x is 0 or 1. Preferably the dihydric phenol is 2,2-bis(4-hydroxyphenyl)propane, typically called bisphenol-A.

It is also within the scope of the invention to employ a hydroxy aromatic acid as a reactant. Use of a hydroxy aromatic acid forms a random polyarylate containing the divalent radical contributed by the hydroxy aromatic acids. The hydroxy aromatic acids within the scope of this invention are those wherein the carboxyl functional groups are attached directly to an aromatic ring, but not necessarily the same ring. Examples of hydroxy aromatic acids are disclosed in U.S. Pat. No. 4,429,105. A particularly preferred hydroxy aromatic acid is p-hydroxybenzoic acid.

The hypernucleophilic base, acid anhydride, dihydric phenol and dicarboxylic acid can be reacted to form the polyarylate in step (A) in accordance with procedures well known in the art using one or more conventional reaction vessels. In a preferred embodiment, the polyarylate is prepared in one reaction vessel by adding the acid anhydride, dihydric phenol, dicarboxylic acid and hypernucleophilic base catalyst to the reaction vessel and reacting these materials to form the diester derivative of the dihydric phenol and then subsequently reacting the diester and dicarboxylic acid to form the low molecular weight polymer.

If desired, an alkali metal salt of an acid can be used to further catalyze the reaction. Examples of suitable materials include potassium acetate, sodium acetate, lithium acetate, potassium propionate, sodium propionate, and lithium propionate.

The polymerization reaction of step (A) is conducted for a period of time sufficient to produce a solid polyarylate having an inherent viscosity of at least 0.1. Typically the inherent viscosity is at least about 0.12.

The polymerization reaction of step (A) is conducted at a temperature in the range of 140° C. to 320° C. preferably 250° to 300° and more preferably 270° to 290°.

In accordance with step (B) the solid, low molecular weight polyarylate prepared in step (A) is increased in molecular weight to an inherent viscosity of at least 0.4. The molecular weight can be increased by techniques, well known in the art, such as solid phase wherein the polymer is ground into particles and the solid particles techniques are heated in an inert atmosphere or in a vacuum above its glass transition temperature and below its melting point to high polymer of inherent viscosity of at least 0.4, preferably 0.5 to greater than 2.0.

A sufficient portion of the prepolymer must be crystalline prior to solid state build up. The prepolymer may be crystallized naturally on controlled cooling to a solid or it may be quenched to an amorphous state, depending on the composition on the aromatic polyester. The amorphous prepolymer may be crystallized by thermal treatment, or it may be crystallized by treatment with a suitable liquid agent which is a nonsolvent or a very poor solvent for the amorphous prepolymer. Preferably this is the same alkanoic acid removed as by-product. The amorphous prepolymer may also be crystallized by treatment with a suitable vapor or gaseous agent. Preferably this is the same alkanoic acid by-product heated above its condensation temperature. The amorphous prepolymer may also be crystallized rapidly by a supercritical fluid, which is generally a gas raised above its critical temperature and pressure, which is a non-solvent or a very poor solvent for the amorphous prepolymer.

When the aromatic dicarboxylic acid is terephthalic acid and isophthalic acid the amount of terephthalic acid should not be less than about 60 mole percent or not more that about 15 mole percent in order for the time required for solid state polymerization to be commercially practical. If a polyarylate having less than about 60 mole percent or more that about 15 mole percent terephthalic acid is desired the polymer can be prepared by preparing a melt blend of polymers which under the influence of time and at an appropriate temperature will equilibrate into the desired poylarylate. For example, a polyarylate composed of 50 mole percent terephthalic acid, 50 mole percent isophthalic acid and bisphenol A can be prepared by melt blending 2 parts of a polyarylate composed of isophthalic acid and bisphenol A and 5 parts of a polyarylate composed of 70 mole percent terephthalic acid, 30 mole percent isophthalic acid and bisphenol A. The polyarylates which are melt blended can be prepared using the process of this invention.

The inherent viscosity of the polyarylates prepared by the process of this invention is determined at 25° C. using 0.50 g/100 mL of a mixture of 60 volumes of phenol and 40 volumes of 1,1,2,2,-tetrachloroethane. The inherent viscosity is at least 0.3, preferably 0.5 and more preferably 0.6 or greater.

The polyarylates prepared by the process of this invention are useful as injection-molding plastics, films, and in blends with other polymers, such as polycarbonates and polyesters.

EXAMPLE 1

This example illustrates the better color and enhanced rates of polymerization achieved by using 4-dialkylaminopyridine catalysts versus other tertiary amines or no catalyst at all.

A 250 mL round bottom flask equipped with side arm condenser to a graduated collector was charged with 24.9 g (0.15 mol) of terephthalic acid and 46.9 g (0.15 mol) of recrystallized bisphenol A diacetate. To the mixture, under nitrogen, there is added 1.0 mL of 0.15M tertiary amine in toluene (or 1.0 mL of toluene alone for the control). Thus the concentration of tertiary amine present in all experiments was 0.1 mol %. The contents were stirred under nitrogen and heated in a Wood's metal bath set at 200° C. (t=0), reset to 225° at t=5 minutes, to 250° at t=15, to 275° at t=25 and finally to 290° at t=30; the bath temperature was held at 290°±2° C. The acetic acid by-product of polyesterification was collected and its volume measured as a function of time. Reaction rates are expressed in mL of acetic acid evolved per minute at the final bath temperature of 290°±2° C. (the melt was 284°±2° C.). Polymerization was allowed to proceed until the polymer solidified in the flask (ca. 60% conversion). The solid prepolymer was ground. Because this low molecular weight polymer is insoluble in most common solvents, color was measured directly on the powder using a Gardiner XL-23 Colorimeter. Results of this work are presented in Table 1.

TABLE 1

| Tertiary Amine | Color | Rate (mL/min) |
| --- | --- | --- |
| none (control) | 23.1 | 0.083 |
| 4-dimethylaminopyridine | 18.4 | 0.348 |
| 4-pyrrolidinopyridine | 20.9 | 0.406 |
| 4-piperidinopyridine | 22.1 | 0.341 |
| quinoline | 22.1 | 0.064 |
| 4-methylmorpholine | 22.8 | 0.104 |
| 1-methylpyrrolidine | 22.9 | 0.117 |
| quinoxaline | 23.4 | 0.103 |
| 4-t-butylpyridine | 23.4 | 0.118 |
| copoly(4-vinylpyridine-styrene) | 23.5 | 0.099 |
| 1-methylpyrrole | 24.5 | 0.111 |
| 1-methylimidazole | 25.0 | 0.115 |
| 2-methoxypyrazine | 25.4 | 0.060 |
| 2-dimethylaminopyridine | 26.5 | 0.098 |
| 1,4-diazabicyclo[2.2.2]-octane | 27.3 | 0.109 |
| tetramethylphenylene-diamine | 29.6 | 0.081 |
| 1-methylpiperidine | 30.7 | 0.131 |
| 1-methylindole | 30.9 | 0.071 |
| 1,5-diazabicyclo[4.3.0]-non-5-ene | 37.2 | 0.200 |
| quinazoline | 41.7 | 0.086 |

The three 4-dialkylaminopyridines, which include two 4-cycloalkylaminopyridines, achieved better results than the rest of the amines as regards both the color of the polymer produced and the polymerization rate.

EXAMPLE 2

This example illustrates the final polymer colors and inherent viscosities obtained after solid state polymerization of prepolymers prepared with 0.1 mol % 4-dimethylaminopyridine (abbreviated as DMAP in the remainder of these examples), with DMAP (0.1%) plus 0.4% potassium acetate, with DMAP (0.1%) plus 0.2% poly(sodium acrylate) and without any catalyst added.

A 0.5 L flask with condenser leading to a graduated cylinder was charged with 60.6 g (365 mmol) isophthalic acid, 832 g (365 mmol) bisphenol A and 89.3 g (875 mmol) acetic anhydride which is 20% in excess of stoichiometry. The catalyst(s) added to the mixture was (were) 1.0 mL 0.365M DMAP in toluene and, optionally, plus 2.0 mL 0.73M KOAc in 80/20 HOAc/Ac$_2$O or 0.03 g of the sodium salt. All three runs with catalyst(s) present were stirred under nitrogen and heated in a Wood's metal bath from 105° C. to 250° directly in 30 minutes. It was determined by GC that acetylation of the bisphenol A to form bisphenol A diacetate is quantitative within one minute at 105° C. with 0.1 mol % DMAP present. Acetic acid, by-product of the acetylation, first distills over when the bath temperature passes 135° C. The bath was held at 250° for 30 minutes, then heated to 275° for 30 minutes and finally to 290° until the volume of condensate indicated the reaction was 70% complete; that was typically 15 minutes. When no catalyst was added a different heating schedule had to be followed. In the first stage, the bath was held at 125° C. for 2 hours to assure complete acetylation of the bisphenol A, after which it was raised to 250° C. and held for 2 hours, then to 275° for 2.5 hours and finally held at 290° for 30 minutes. The slow progression of temperature in this final prepolymer stage was necessary to avoid distilling over any monomer or oligomers and possibly upsetting stoichiometry.

All solid prepolymers crystallized naturally in the flask on cooling, were ground at room temperature in a Wiley mill and sieved. The powdered prepolymers were heated with an equal weight of acetic acid for 5 minutes at 80° C. and dried in air overnight on a paper towel. Equal weights (5.7 g) of prepolymer powder that passed a 20 mesh screen, but not 60 mesh, were heated in tubes under vacuum (0.2 Torr). Temperature was programmed to go from 150° to 250° at 25°/hour and then to 290° C. at 20°/hour. The solid state polymerization temperature was held at 290° C., and after 2 and 8 hours at 290°, tubes were removed and the resulting polymer analyzed. The inherent viscosities (dL/g) were measured by dissolving 0.1 g in phenol/tetrachloroethane/p-chlorophenol (25/35/40) at room temperature. The yellowness indices (ASTM D1925-70) and color differences were calculated from the tristimulus values (ASTM E308-85) which were generated from transmittance values in the visible spectra of freshly prepared solutions of 0.5 g polymer in 25 mL methylene chloride/trifluoroacetic acid (70/30) measured on a Perkin-Elmer Lambda 7UV/visible spectrophotometer. The color differences were calculated with respect to a point in tristimulus space defined as being pure white to the human eye, [1969 J. Opt Soc. Am. 59, 986-90]. Colors in Table 1 are based on the intensity of visible light reflected from a solid powder. The color differences in Table 2 derive from the intensity of visible light that passes through a solution of the polymer. Evidence of branching was found for the polymers made with the cocatalyst salts present.

TABLE 2

| Catalyst | Time at 290° | I V | Color difference | Yellowness index |
| --- | --- | --- | --- | --- |
| none | 2 hrs. | 0.54 | 40 | 42 |
|  | 8 hrs. | 0.84 | 49 | 54 |
| DMAP | 2 hrs. | 0.66 | 13 | 13 |
|  | 8 hrs. | 1.01 | 22 | 22 |
| DMAP + K | 2 hrs. | 0.99 | 48 | 51 |
|  | 8 hrs. | insol. | 66 | 83 |
| DMAP + Na | 2 hrs. | 0.98 | 24 | 23 |
|  | 8 hrs. | 1.64 | 42 | 38 |

EXAMPLE 3

This example illustrates that the benefits of using the DMAP catalyst are preserved on scaling up the polyesterification.

Three hundred pounds of a polyarylate prepolymer were prepared in a 75 gallon, oil-heated reactor made of stainless steel equipped with a spray tower to remove the by-product acetic acid. The reactor was charged with 191.2 lbs. (380 Mols) bisphenol A, 90.4 lbs. (247 mols) terephthalic acid, 48.7 lbs. (133 mols) isophthalic acid, 205.1 lbs. (912 mols) acetic anhydride and 46.5 grams 4-dimethylaminopyridine dissolved in 1 gallon toluene. The agitated mixture was heated directly to 280° C. which took 4.3 hours and held at that temperature for 30 minutes. The hot prepolymer melt was extruded into water, dried and ground. Its inherent viscosity measured 0.16. The prepolymer powder was crystallized by heating 150 lbs. with 30 lbs. of acetic acid to 110° C. in a tumble dryer for 15 minutes followed by continued heating under reduced pressure with nitrogen purge to remove the acetic acid. Portions were solid state polymerized in various ways: 1, in the same vessel used for crystallization; 2, in a fluidized bed reactor; and 3, on a small scale, under vacuum, in the laboratory. The results of the latter are presented in Table 3.

TABLE 3

| Hours at | 270° C. | | 260° C. | |
| --- | --- | --- | --- | --- |
| | I V | Color difference | I V | Color difference |
| 0 | 0.25 | 8 | 0.26 | 8 |
| 2 | 0.54 | 8 | 0.45 | 7 |
| 4 | 0.68 | 10 | 0.57 | 10 |
| 10 | 0.96 | 13 | 0.74 | 8 |

EXAMPLE 4

A 500 mL flask was charged with 45.0 g (0.27 mol) isophthalic acid and 77.4. g (0.27 mol) of the diacetate of oxydiphenol (4,4'-dihydroxydiphenyl ether) plus 0.1 g DMAP and 0.1 g potassium acetate. The flask and contents were heated while stirring under nitrogen for one hour at 250° C. (60% conversion was achieved). Temperature was then raised to 275° and vacuum was applied gradually, reaching 0.1 Torr in 25 minutes. The polymerization was stopped when the polymer melt began wrapping the stir shaft (no longer in sufficient contact with the flask walls for adequate heat transfer), only 10 minutes after the final pressure was reached. On cooling in the flask to ambient temperature under nitrogen, the polymer crystallized; its inherent viscosity in phenol/tetrachloroethane/p-chlorophenol (25/35/40) was 0.40 dL/g.

The grinds of two such runs were combined (148 g) in a 500 mL flask and heated under a dry nitrogen sweep at reduced pressure (10 Torr) for 0.5 hr. at 200°, for 2 hrs. at 250° and finally for 4 hrs. at 265° C. while stirring the powder. The crystalline polymer powder was directly molded into test bars at 350° C. on a Watson-Stillman injection molding machine. The plastic bars were a clear, beige color.

EXAMPLE 5

This example illustrates the varying compositions which can be prepared using the process of this invention. All batches listed in Table 4 were prepared under nitrogen at atmospheric pressure in 500 mL flasks charged with 83.2 g (365 mmol) bisphenol A, 60.6 g (365 mmol) total combination of terephthalic acid (TPA) and isophthalic acid (IPA) in the mol ratio indicated in the Table, 89.3 g (875 mmol) acetic anhydride (20% excess) plus 1.0 mL of 0.365M DMAP intoluene. All were heated in a Wood's metal bath from 105° directly to 300° C. (bath temperature) and kept at 300° until 90% of the theoretical volume of distillate was collected, from 30 to 45 minutes. All ground prepolymers were crystallized in acetone and dried in air before solid state polymerization in horizontal tubes under vacuum (0.1 Torr).

TABLE 4

| Ratio | | Final | Final Solid State |
| --- | --- | --- | --- |
| TPA | IPA | I V | Polymerization Conditions |
| 75 | 25 | 1.10 | 290°, 8 hours |
| 60 | 40 | 1.96 | 290°, 8 hours |
| 50 | 50 | 0.74 | 230°, 42 hours |
| 35 | 65 | 0.56 | 220°, 55 hours |

We claim:
1. A process comprising
   (A) preparing a solid polyarylate prepolymer having an inherent viscosity of at least about 0.1 by heating at a temperature in the range of 140° C. to 300° C. in the melt phase an acid anhydride derived from a carboxylic acid containing 2 to 6 carbon atoms, a dihydric phenol and an aromatic dicarboxylic acid in the presence of a hypernucleophilic base which comprises a heterocyclic aromatic compound containing nitrogen and having an aprotic electron releasing group directly bonded to a carbon atom in the aromatic compound, and
   (B) increasing the molecular weight of the solid polyarylate prepolymer to an inherent viscosity of at least 0.4 as determined at 25° C. using 0.50 g/100 mL of a mixture of 60 volumes of phenol and 40 volumes of 1,1,2,2,-tetrachloroethane.

2. The process of claim 1 wherein the dihydric diphenol corresponds to the formula $$H-O-\underset{}{\underset{(y)_z}{\bigcirc}}-R'-\left[\underset{}{\underset{(y)_z}{\bigcirc}}\right]_x-O-H$$

wherein y is selected from alkyl groups of 1 to 4 carbon atoms, chlorine, or bromine, z has a value of from 0 to 4, and R' is a chemical bond connecting the aromatic range or is selected from a divalent aliphatic hydrocarbon radical having 1 to 8 carbon atoms, a cycloalkylene, or cycloalkylidene radical having up to 9 carbon atoms, O, S, SO, $SO_2$ or CO and x is 0 or 1.

3. The process of claim 2 wherein the dihydric phenol is bisphenol-A.

4. The process of claim 1 wherein the acid containing 2 to 5 carbon atoms is acetic acid or propionic acid.

5. The process of claim 1 wherein the aromatic dicarboxylic acid is selected from the group consisting of isophthalic acid, terephthalic acid, and mixtures thereof.

6. The process of claim 1 wherein the hypernucleophilic base is selected from the group consisting of 4-dialkylaminopyridine, 4-pyrrolidinopyridine and 4-piperidinopyridine.

* * * * *